(12) United States Patent
Dun

(10) Patent No.: US 6,969,028 B2
(45) Date of Patent: Nov. 29, 2005

(54) SCARF NOZZLE FOR A JET ENGINE AND METHOD OF USING THE SAME

(75) Inventor: Roy Dun, Renton, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 10/351,159

(22) Filed: Jan. 22, 2003

(65) Prior Publication Data

US 2004/0140397 A1 Jul. 22, 2004

(51) Int. Cl.[7] .............................................. B64D 27/00
(52) U.S. Cl. ......................... 244/54; 244/53 R; 244/56; 244/66
(58) Field of Search .................. 244/56, 66, 53 R, 244/54, 23 D; 239/265.11, 265.19, 265.35, 230

(56) References Cited

U.S. PATENT DOCUMENTS

| | | | | | |
|---|---|---|---|---|---|
| 3,067,968 | A | * | 12/1962 | Heppenstall | ............... 244/53 R |
| 3,392,529 | A | * | 7/1968 | Pike et al. | ..................... 60/232 |
| 3,495,682 | A | * | 2/1970 | Treiber | ....................... 181/220 |
| 3,625,432 | A | * | 12/1971 | Bragg | ................... 239/265.35 |
| 3,773,280 | A | * | 11/1973 | Buchstaller | .................... 244/56 |
| 3,964,568 | A | | 6/1976 | Neumann | |
| 4,949,918 | A | * | 8/1990 | Arszman | .................... 244/3.22 |
| 6,360,528 | B1 | * | 3/2002 | Brausch et al. | ................ 60/262 |
| 6,505,706 | B2 | | 1/2003 | Tse | |
| 6,532,729 | B2 | * | 3/2003 | Martens | ........................ 60/204 |
| 6,612,106 | B2 | * | 9/2003 | Balzer | ........................... 60/204 |

* cited by examiner

Primary Examiner—Tien Dinh
(74) Attorney, Agent, or Firm—Harness Dickey & Pierce P.L.C.

(57) ABSTRACT

A scarf nozzle for a jet engine supported within a nacelle. The scarf nozzle is at an aft end of the nacelle. The scarf nozzle includes a first trailing edge portion and a second trailing edge portion. The second trailing edge portion is disposed aft of the first trailing edge portion. The scarf nozzle is configured to allow the nacelle to be integrated closer to a wing without adversely affecting the pressure gradient between the nacelle and the wing. The scarf nozzle allows a portion of an exhaust plume exiting the aft end of the nacelle to interact more favorably with an airflow along one or more surfaces adjacent the nacelle, thus delaying the onset of adverse pressure gradients and the formation of shock waves between the nacelle and the adjacent surfaces and between the adjacent surfaces and the exhaust plume.

34 Claims, 5 Drawing Sheets

NOSE UP PITCH

NOSE DOWN PITCH

YAW LEFT

YAW RIGHT

ROLL LEFT

ROLL RIGHT

SCARF NOZZLE FOR A JET ENGINE AND METHOD OF USING THE SAME

FIELD OF THE INVENTION

The present invention relates generally to jet engines and more particularly to jet engine nacelle nozzles.

BACKGROUND OF THE INVENTION

The relative location of a nacelle nozzle to a wing can adversely affect the wing's pressure gradients and thus the drag of the wing as a result of the interaction of exhaust gases and ambient air adjacent the nozzle. For example, locating a nozzle relatively close to the most adverse pressure gradient on a wing can easily lead to an increase in the wing's adverse pressure gradient to the point at which the drag of the wing is not desirable. In addition, the close proximity of an engine nacelle to the wing undersurface can also lead to the formation of early shock waves generated from the high flow velocities between the wing undersurface and the nacelle and/or between the wind undersurface and the exhaust plume.

To mitigate a nacelle's influence on a wing's pressure field, a common method includes positioning nacelles farther away (e.g., forward and/or vertically) from the wing. Although this method has been successful for its intended purpose, these methods typically require additional structure (e.g., struts, etc.) and weight for supporting the nacelles at the more distant positions from the wing. In addition, positioning the nacelles farther away from the wing also increases the wetted area of, and thus the skin friction drag of, the nacelles and the mounting structure.

SUMMARY OF THE INVENTION

Accordingly, a need exists in the art for a device and method that mitigates the adverse effect that a nacelle nozzle has on wing pressure gradients but which also does not require additional structure or weight for supporting the nacelle.

In one preferred form, the present invention provides a scarf nozzle at an aft end of a nacelle housing of a jet engine. The scarf nozzle includes a first trailing edge portion and a second trailing edge portion that is disposed aft of the first trailing edge portion. The scarf nozzle is configured to allow the nacelle to be integrated closer to a wing without adversely affecting the pressure gradient between the nacelle and the wing. During operation of the jet engine, the scarf nozzle allows a portion of an exhaust plume exiting the aft end of the nacelle to interact more favorably with an airflow along one or more surfaces adjacent the nacelle, such as wing surfaces, struts, flaps, sensor mountings, etc. In doing so, the scarf nozzle at least delays the onset of adverse pressure gradients and the formation of shock waves between the wing and the nacelle and between the wing and the exhaust plume.

In another preferred form, the present invention provides a method of operating a jet engine supported within a nacelle. In one embodiment, the method comprises using the jet engine to generate an exhaust flow; and discharging the exhaust flow from the nacelle through the scarf nozzle.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
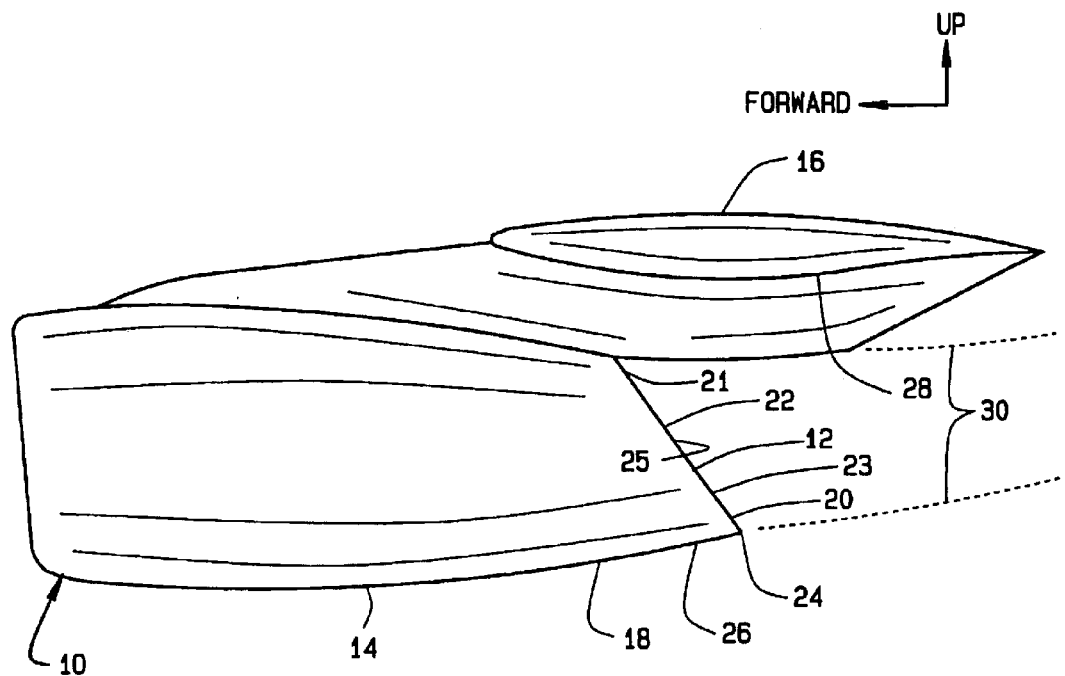
FIG. 1 is a side view of an exemplary jet engine supported within a long-duct nacelle that includes a scarf nozzle in accordance with a preferred embodiment of the present invention.
Figure 2:
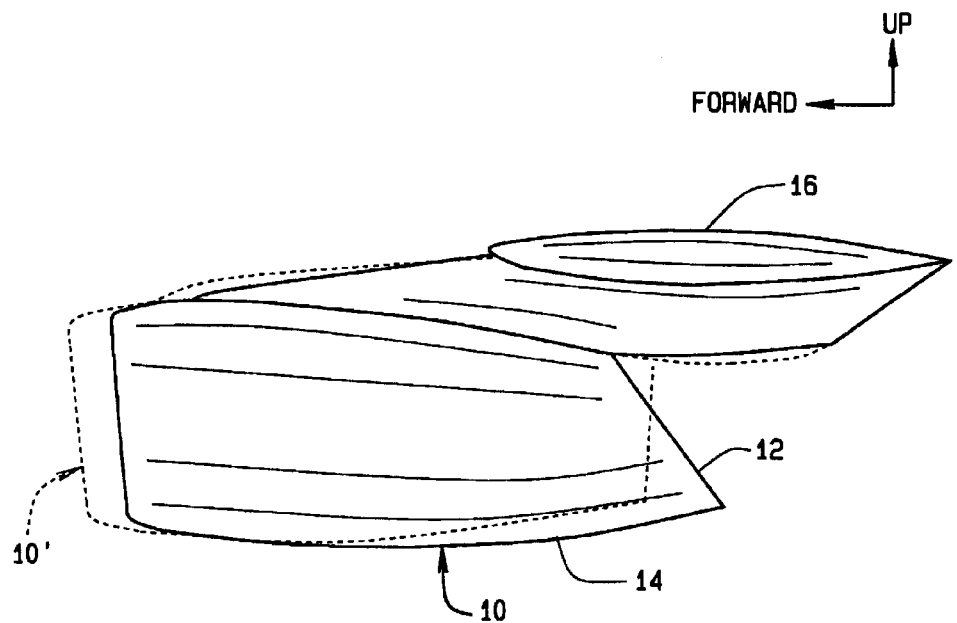
FIG. 2 is a side view illustrating the jet engine shown in FIG. 1 superimposed upon a conventional jet engine supported within a long-duct nacelle shown in dashed lines, wherein the conventional jet engine does not include a scarf nozzle.
Figure 3:
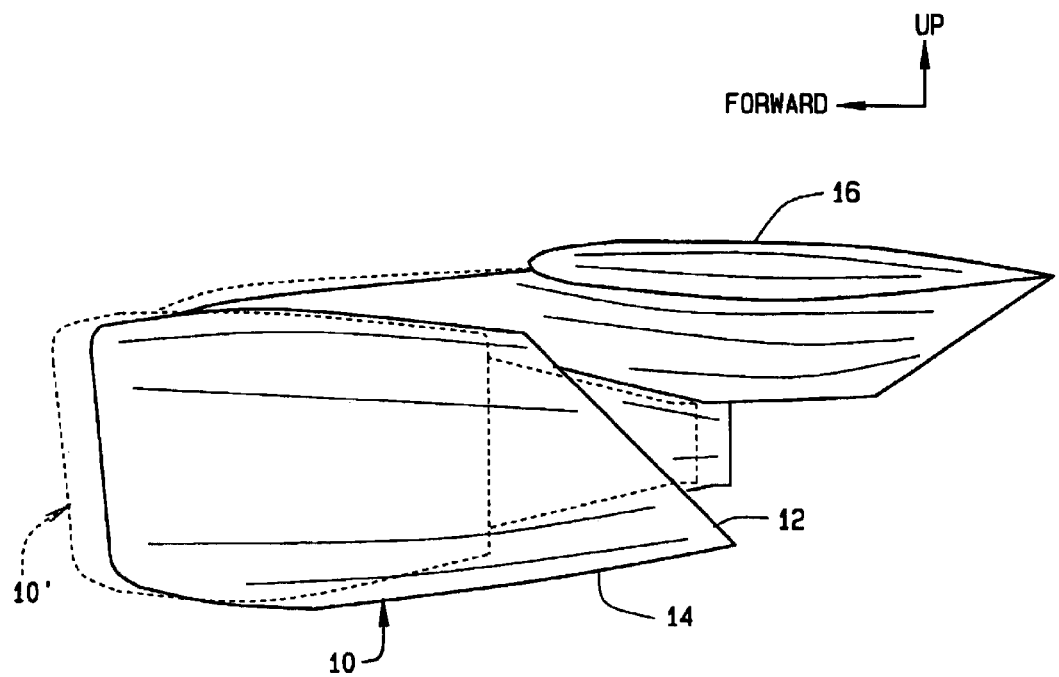
FIG. 3 is a side view illustrating an exemplary jet engine supported within a ¾-duct nacelle that includes a scarf nozzle superimposed upon a conventional jet engine supported within a ¾-duct nacelle shown in dashed lines, wherein the conventional jet engine does not include a scarf nozzle.

Referring to FIG. 1, there is shown an exemplary jet engine 10 of a mobile platform, such as an aircraft, that includes a scarf nozzle 12 in accordance with a preferred embodiment of the present invention. The jet engine 10 includes a housing or nacelle 14 that is shown mounted under an aircraft wing 16, although such is not required. It should be noted that the nacelle 14 need not comprise a long-duct nacelle as shown in FIGS. 1 and 2, but may, for example, comprise a ¾-duct nacelle as shown in FIG. 3.

The scarf nozzle 12 is formed at an aft end 18 of the nacelle 14. As explained in greater detail below, the scarf nozzle 12 is configured to allow at least a portion of an exhaust plume 30 exiting the aft end 18 of the nacelle 14 to interact more favorably with an airflow along one or more surfaces adjacent the nacelle 14, such as a wing surface 28, a strut, a flap, a sensor mounting, etc.

The scarf nozzle 12 includes a trailing edge 20 defining an exit or outlet 22 from which an exhaust plume and gases are discharged from the jet engine 10. Preferably, the trailing edge 20 is chamfered or beveled.

The trailing edge 20 includes a first trailing edge portion 21 and a second trailing edge portion 23. The second trailing edge portion 23 is disposed aft of the first trailing edge portion 21.

The trailing edge 20 preferably defines a shape in accordance with a function tailored to the particular aircraft and engine in which the scarf nozzle 12 is being used. By way of example only, the trailing edge 20 may define a shape that is substantially elliptical, although other shapes and complex curves are also possible for the trailing edge.

The portion of the trailing edge 20 that is disposed most rearward from or downstream of the nacelle aft end 18 is referred to herein as a rear-most edge 24 of the scarf nozzle 12. In the preferred embodiment shown in FIG. 1, the rear-most edge 24 of the scarf nozzle 12 is disposed at a bottommost trailing edge position 26. It should be noted, however, that the position of the rear-most edge 24 need not be at the bottommost trailing edge position 26 of the scarf nozzle 12 as shown in FIG. 1. In other embodiments, the rear-most edge 24 may be disposed at least partially inboard or outboard from the bottommost trailing edge position 26 depending at least in part on the particular exhaust flow attributes of the jet engine for which the scarf nozzle 12 is being used.

When the rear-most edge 24 of the scarf nozzle 12 is disposed at a bottommost trailing edge position 26, the scarf nozzle 12 imparts a slightly upward vector to the exhaust plume 30. The effect of the scarf nozzle 12 on the velocity vector of the exhaust plume 30 may be mitigated or negated by appropriately tailoring the interior of the scarf nozzle 12. For example, the interior of the scarf nozzle 12 may be designed such that the velocity vector of the exhaust plume 30 is slightly downward or straight aft even with the scarf nozzle 12.

Orienting the scarf nozzle 12 such that the first trailing edge portion 21 is positioned adjacent the wing underside 28 allows a more favorable flow interaction to occur between the exhaust plume 30 and the wing lower surface 28. During operation, at least an upper portion of the exhaust plume 30 interacts more favorably with the lower wing surface 28 and with air flow being channeled between the wing 16 and the nacelle 14 and between the wing 16 and the exhaust plume 30. This more favorable interaction is due at least in part to the pseudo-flexible nature of the exhaust plume 30, which can adjust depending on the pressure gradient between the wing 16 and the exhaust plume 30. Scarfing the nozzle 12 increases the exposure of the airflow along the wing lower surface 28 to the exhaust plume 30 while also reducing the airflow's exposure to the nacelle 18, which is less flexible and less forgiving than the exhaust plume 30.

The scarf nozzle 12 reduces the adverse pressure gradients caused by the presence of the nacelle 14 (i.e., caused by the interaction of the surfaces of the nacelle 14 and the wing lower surface 28) and the exhaust plume 30, and thus delays the formation of shock waves between the wing 16 and the nacelle 14 and between the wing 16 and the exhaust plume 30. Accordingly, the scarf nozzle 12 allows the nacelle 14 to be integrated closer to the aircraft wing 16, as can be seen by comparing the mounting locations of the engine 10 with the engine 10' shown in dashed lines in FIG. 2 and FIG. 3. By allowing the jet engine 10 to be integrated closer to the wing 16, less structure and weight is needed to mount the engine 10 to the wing 16. This in turn reduces the wetted area of, and thus the skin friction drag of, the nacelle 14 and the structure used to mount the nacelle 14 to the wing 16.

It should be noted that the configuration of the scarf nozzle 12 will vary depending at least in part upon the particular exhaust flow attributes of the engine and the particular aircraft for which the scarf nozzle 12 is being used.

In addition, the rear-most edge 24 of the scarf nozzle 12 at least partially shields aircraft engine noise from being transmitted in a forward and/or downward direction. Preferably, an inner surface of the scarf nozzle 12 is lined with a suitable acoustical or noise attenuating material 25 for attenuating engine and jet noise. Due to the extended length of the lower portion of the scarf nozzle 12, more acoustical material than conventional nozzles can be accommodated.

The scarf nozzle's 12 attenuation of engine noise can be especially useful while the aircraft is operating within the local airspace of an airport to reduce noise to communities neighboring the airport. This reduction and redirection of aircraft engine noise allows for increased flexibility in managing the environmental impacts of departing and arriving aircraft.

Figure 4:
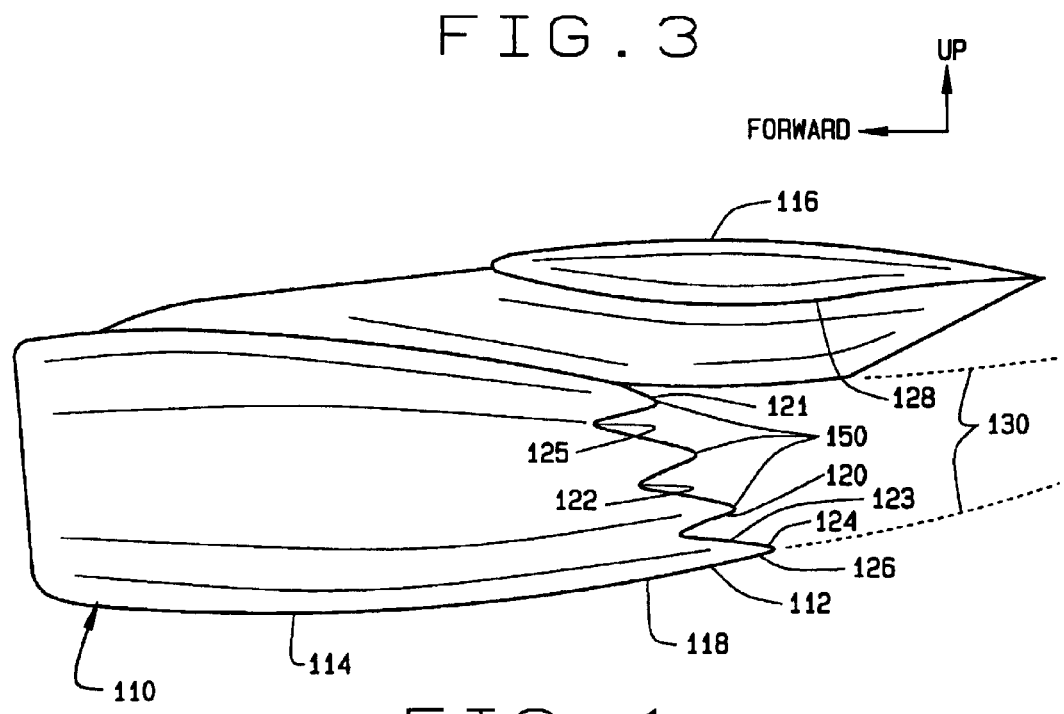
FIG. 4 is a side view of an exemplary jet engine supported within a long-duct nacelle that includes a scarf nozzle in accordance with another preferred embodiment of the present invention, wherein the scarf nozzle includes a plurality of chevrons.

In FIG. 4, there is shown an alternative embodiment 112 of the scarf nozzle. The scarf nozzle 112 includes a plurality of chevrons 150 such that the trailing edge 120 of the scarf nozzle forms a substantially saw tooth configuration. The chevrons 150 are disposed circumferentially around the exit or outlet 122 defined by the trailing edge 120 of the scarf nozzle 112.

The scarf nozzle 112 is preferably configured with the first or shorter trailing edge portion 121 positioned closer to the wing 116 undersurface 128 than the second or longer trailing edge portion 123. This configuration allows at least an upper portion of the exhaust flow 130 to interact more favorably with the lower wing surface 128 and the ambient air being channeled between the wing 116 and the nacelle 114 and between the wing 116 and the exhaust plume 130. In addition, the scarf nozzle 112 reduces the adverse pressure gradients between the wing 116 and the nacelle 114 and between the wing 116 and the exhaust plume 130, thus delaying the formation of shock waves. Further, the scarf nozzle 112 allows the nacelle 114 to be integrated closer to the aircraft wing 116 and be mounted with less structure and weight. This in turn reduces the wetted area of, and thus the skin friction drag of, the nacelle 114 and the structure used to mount the nacelle 114 to the wing 116.

Regarding noise attenuation, a primary source of engine noise is created by the turbulence in the jet engine exhaust exiting at high speeds and temperatures. During operation of the jet engine 110, however, the chevrons 150 allow the engine exhaust gases to mix more thoroughly with the cooler ambient air adjacent the scarf nozzle 112. This in turn reduces the turbulence of the engine exhaust and ultimately results in a reduced level of engine noise.

Additionally, the rear-most edge 124 of the scarf nozzle 112 is preferably disposed at a bottommost trailing edge position 126 of the scarf nozzle 112. Accordingly, the rear-most edge 124 at least partially shields engine noise from being transmitted downward. Moreover, an inner surface of the scarf nozzle 112 is also preferably lined with a suitable noise attenuating or acoustical material 125 to provide for further attenuation of the engine noise.

Figure 5:
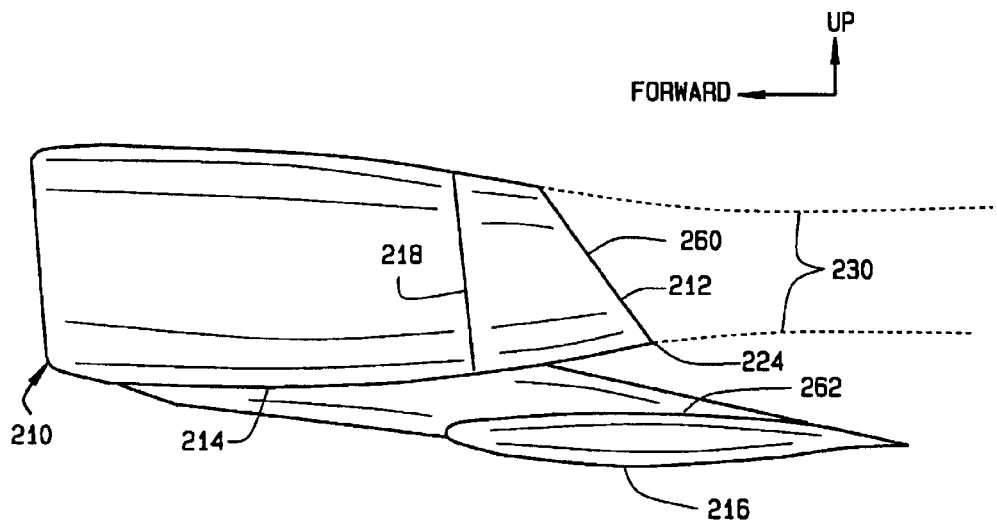
FIG. 5 is a side view of an exemplary jet engine supported within a long-duct nacelle that includes a rotatable scarf nozzle in accordance with yet another preferred embodiment of the present invention, wherein the scarf nozzle is shown in a preferred high-lift configuration.
Figure 6:
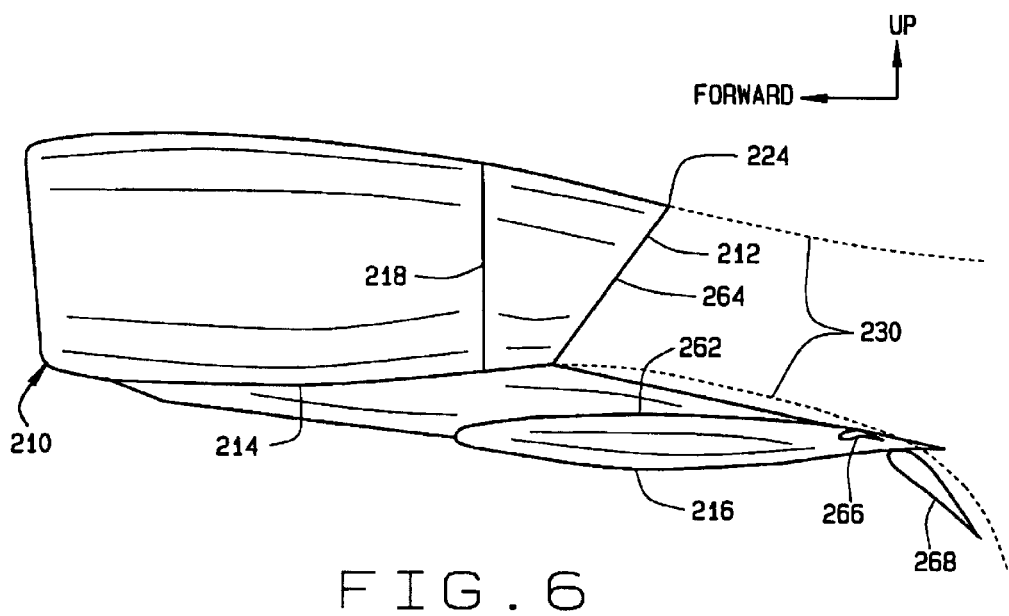
FIG. 6 is a side view of the jet engine shown in FIG. 5 with the rotatable scarf nozzle in a preferred cruise configuration.

In FIGS. 5 and 6, there is shown an alternative embodiment in which the scarf nozzle 212 is controllably rotatable with respect to the engine nacelle 214 to a plurality of angular positions or orientations. The scarf nozzle 212 is engaged to the aft end 218 of the nacelle 214 in a manner that allows the scarf nozzle 212 to have a rotational axis that is substantially parallel with the nacelle's 214 longitudinal centerline axis, although such is not required. For example, the rotational axis of the scarf nozzle may instead be skewed relative to the longitudinal centerline axis of the nacelle. It should be noted that although the engine nacelle 214 is shown mounted above an aircraft wing 216, such is not required.

Any one of a wide range of suitable mounting systems and methods known in the art may be used to rotationally engage the rotatable scarf nozzle 212 to the nacelle 214. In addition, the actuation system used to rotatably move the scarf nozzle 212 may comprise any one of a wide range of actuation systems (e.g., hydraulic, electric, pneumatic, mechanically driven gears, or other actuation means) known in the art. In addition, any one of a wide range of locking mechanisms (e.g., actuated locking pins sized to engage recesses) known in the art may be used to removably secure the scarf nozzle 212 in the various preferred angular orientations.

In FIG. 5, the rotatable scarf nozzle 212 is shown in a configuration 260 that is preferred when the aircraft is in a cruise mode of operation. The rotatable scarf nozzle 212 is rotated to dispose the rear-most edge 224 at a bottommost position of the scarf nozzle 212. When the rear-most edge 224 is forming the bottommost portion of the rotatable scarf nozzle 212, the scarf nozzle 212 provides or directs the exhaust plume 230 directly aft, i.e., opposite the direction of flight. Accordingly, the rotatable scarf nozzle 212 reduces the scrubbing drag generated from the engine exhaust over the wing upper surface 262.

In FIG. 6, the rotatable scarf nozzle 212 is shown in a configuration 264 that is preferred when the aircraft is in a high-lift mode of operation (e.g., with flaps 266 and 268 deployed). The rotatable scarf nozzle 212 is rotated to dispose the rear-most edge 224 at about a topmost position of the scarf nozzle 212. When the rear-most edge 224 is forming the topmost portion of the rotatable scarf nozzle 212, the scarf nozzle 212 provides the exhaust plume 230 with an at least partially downward vector towards the wing upper surface 262 and the flaps 266 and 268. Accordingly, the rotatable scarf nozzle 212 increases the lift produced by the wing 216 and the flaps 266 and 268.

Figure 7:
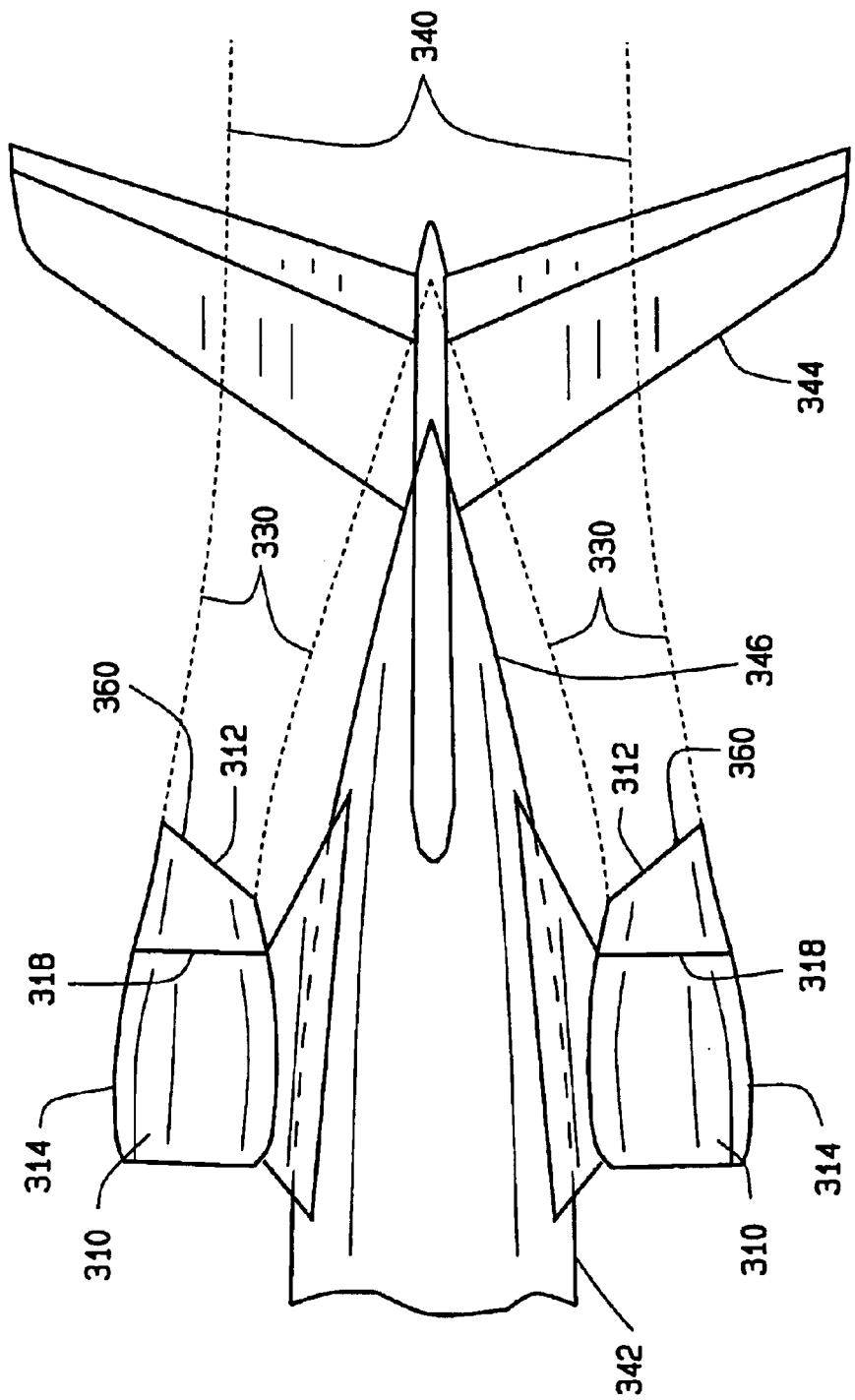
FIG. 7 is a top view of exemplary jet engines supported within aftbody-mounted nacelles each of which includes a rotatable scarf nozzle in accordance with still yet another preferred embodiment of the present invention, wherein the scarf nozzles are shown in a preferred cruise configuration.

In FIGS. 7 and 8, there is shown another embodiment in which the scarf nozzle 312 is disposed at an aft end 318 of an aftbody-mounted engine nacelle 314. The scarf nozzle 312 is controllably rotatable with respect to the aftbody-mounted engine nacelle 314 to a plurality of angular positions or orientations. FIG. 7 shows the scarf nozzle 312 in a configuration 360 preferred when the aircraft is in a cruise mode of operation.

The scarf nozzle 312 is engaged to the aft end 318 of the nacelle 314 in a manner that allows the scarf nozzle 312 to have a rotational axis that is substantially parallel with the nacelle's 314 longitudinal centerline axis, although such is not required. For example, the rotational axis of the scarf nozzle may instead be skewed relative to the longitudinal centerline axis of the nacelle.

During operation, the scarf nozzle 312 can be used to reduce aftbody drag of the fuselage 342. The scarf nozzle 312 can also be used as an eductor for an aft-mounted auxiliary power unit (APU) (e.g., an APU mounted in the aft portion of the fuselage tailcone 346). In addition, the scarf nozzle 312 can also be rotated accordingly to allow for thrust vectoring of the exhaust plumes 330 and the combined exhaust plume 340. This, in turn, allows for reductions in the aircraft's empennage or tail assembly 344 (e.g., reduced areas for the horizontal and vertical tails, elevators, and rudder) and the weight and drag associated therewith.

Figure 8A:
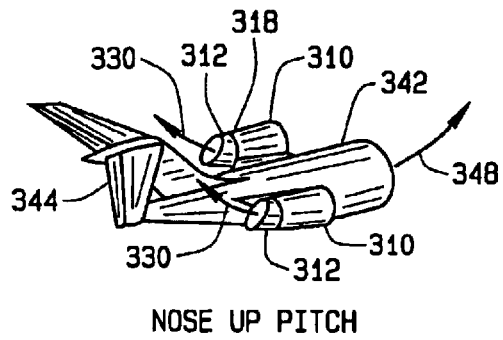
FIGS. 8A through 8F are perspective views of the jet engines shown in FIG. 7 illustrating the rotatable scarf nozzles in various configurations for at least partially controlling aircraft pitch, yaw, and roll.
Figure 8B:
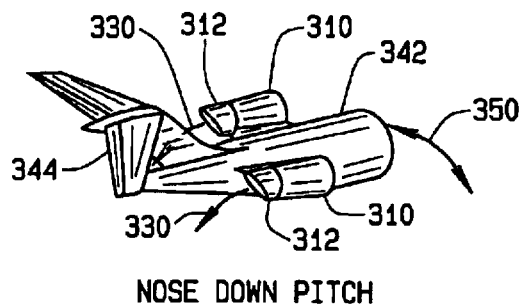
Figure 8C:
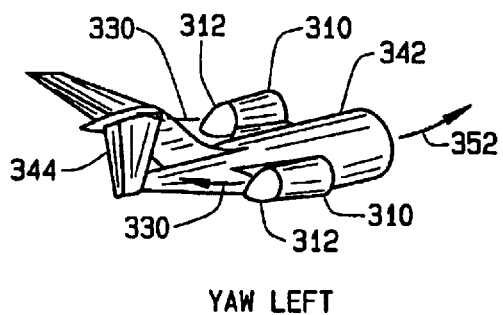
Figure 8D:
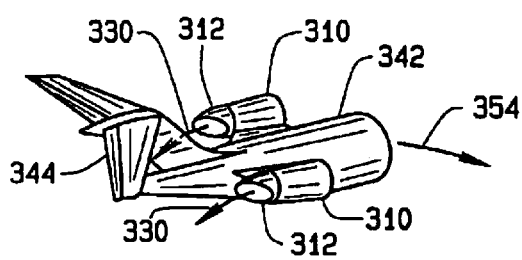
Figure 8E:
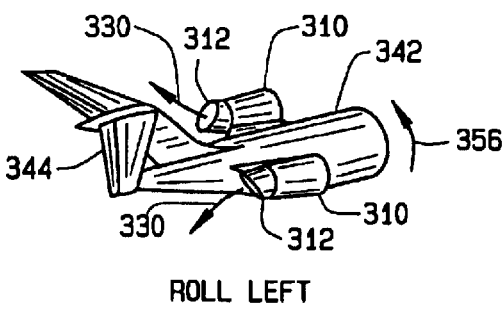
Figure 8F:
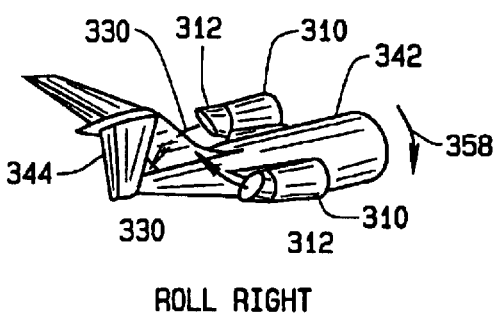

The aircraft pitch, yaw, and roll may be at least partially controlled by appropriately rotating either or both of the scarf nozzles 312. For example, FIG. 8A shows the rotatable scarf inlets 312 in a configuration that provides the aircraft with a nose-up pitch, as indicated by the arrow 348. FIG. 8B shows the rotatable scarf inlets 312 in a configuration that provides the aircraft with a nose-down pitch, as indicated by the arrow 350. FIG. 8C shows the rotatable scarf inlets 312 in a configuration that provides the aircraft with a yaw left, as indicated by the arrow 352. FIG. 8D shows the rotatable scarf inlets 312 in a configuration that provides the aircraft with a yaw right, as indicated by the arrow 354. FIG. 8E shows the rotatable scarf inlets 312 in a configuration that provides a roll left to the aircraft, as indicated by the arrow 356. FIG. 8F shows the rotatable scarf inlets 312 in a configuration that provides a roll right to the aircraft, as indicated by the arrow 358.

In another preferred form, the present invention provides a method of operating a jet engine supported within a nacelle. In one embodiment, the method comprises using the jet engine 10, 110, 210, 310 to generate an exhaust flow or plume 30, 130, 230, 330; and discharging the exhaust flow 30, 130, 230, 330 from the nacelle 14, 114, 214, 314 through the scarf nozzle 12, 112, 212, 312 at the aft end 18, 118, 218, 318 of the nacelle 14, 114, 214, 314.

It is anticipated that the invention will be applicable to any of a wide range of aircraft (e.g., but not limited to, commercial jets, private jets, military jets, among others) regardless of the manner in which the aircraft is piloted (e.g., directly, remotely, via automation, or in a combination thereof, among others). Indeed, the present invention should not be limited to just aircraft either. Rather, it is anticipated that the invention will be applicable to other mobile platforms. Accordingly, the specific references to aircraft herein should not be construed as limiting the scope of the present invention to only one specific form/type of aircraft or to aircraft alone.

It is also anticipated that the invention will be applicable to any one of a wide range of nacelles and engines (e.g., but not limited to gas turbine engines, turbofan engines) regardless of the manner in which the engines and/or the nacelles are mounted to the corresponding aircraft (e.g., but not limited to strut mounted engines, engines mounted toward the forward or aft portion of the wing, under-wing mounted engines, over-wing mounted engines, wing-level engines, aft-body mounted engines, among others). Accordingly, the specific references to engine and nacelle herein should not be construed as limiting the scope of the present invention to only one specific form/type of engine, nacelle, and/or mounting arrangement.

The description of the invention is merely exemplary in nature and is in no way intended to limit the invention, its application, or uses. Thus, variation that do not depart from the substance of the invention are intended to be within the scope of the invention. Such variations are not to be regarded as a departure from the spirit and scope of the invention.

What is claimed is:

1. A jet engine for a mobile platform, the jet engine comprising:
   a housing having a fore end and an aft end; and
   a scarf nozzle at the aft end of the housing, the scarf nozzle including a first trailing edge portion and a second trailing edge portion disposed aft of the first trailing edge portion, the scarf nozzle being configured to at least mitigate an adverse wing pressure gradient increase between the housing and a wing surface of the mobile platform and between the wing surface and an exhaust plume exiting the aft end of the housing to enable the housing to be positioned closer to the wing surface.

2. The jet engine of claim 1, wherein the housing comprises a nacelle.

3. The jet engine of claim 2, wherein the scarf nozzle is configured to allow at least a portion of an exhaust plume exiting the aft end of the nacelle to interact more favorably with a fluid flow along one or more surfaces adjacent the nacelle.

4. The jet engine of claim 2, wherein:
   the first trailing edge portion comprises an upper portion of the scarf nozzle; and
   the second trailing edge portion comprises a lower portion of the scarf nozzle.

5. The jet engine of claim 2, wherein the scarf nozzle comprises a plurality of chevrons configured to allow substantial mixing of at least a portion of an exhaust gas exiting the aft end of the nacelle with ambient air adjacent the scarf nozzle.

6. The jet engine of claim 2, further comprising a noise attenuating material lining at least a portion of an inner surface of the scarf nozzle.

7. The jet engine of claim 2, wherein a rear-most edge of the scarf nozzle is disposed at a bottommost trailing edge position of the scarf nozzle.

8. The jet engine of claim 2, wherein the scarf nozzle is configured to at least delay formation of shock waves between the nacelle and a wing surface adjacent the nacelle.

9. The jet engine of claim 2, wherein the scarf nozzle is configured to at least delay formation of shock waves between the exhaust plume and a wing surface adjacent the nacelle.

10. The jet engine of claim 2, wherein the scarf nozzle is configured to at least mitigate an adverse pressure gradient increase caused by the nacelle and the exhaust plume.

11. The jet engine of claim 2, wherein the scarf nozzle is configured to at least partially shield engine noise from being transmitted downward.

12. The jet engine of claim 2, wherein scarf nozzle is controllably rotatable relative to the nacelle to a plurality of angular positions during different phases of operation of the mobile platform.

13. The jet engine of claim 12, wherein the scarf nozzle is rotatable to dispose a rear-most edge of the scarf nozzle at at least one of:
   a topmost position of the scarf nozzle;
   a bottommost position of the scarf nozzle;
   an outboard position of the scarf nozzle; and a
   an inboard position of the scarf nozzle.

14. The jet engine of claim 12, wherein the scarf nozzle is rotatable to at least one of:
   a configuration in which the scarf nozzle imparts a downward vector to the exhaust plume;
   a configuration in which the scarf nozzle imparts an upward vector to the exhaust plume;
   a configuration in which the scarf nozzle imparts an outboard vector to the exhaust plume; and
   a configuration in which the scarf nozzle imparts an inboard vector to the exhaust plume.

15. The jet engine of claim 2, wherein the mobile platform comprises an aircraft.

16. The jet engine of claim 1, wherein an interior of the scarf nozzle is configured such that a velocity vector of the exhaust plume exiting the aft end of the housing is generally straight aft.

17. The jet engine of claim 1, wherein an interior of the scarf nozzle is configured to direct the exhaust plume to at least mitigate the exhaust plume from exiting the scarf nozzle adjacent the first trailing edge portion prior to reaching the second trailing edge portion.

18. The jet engine of claim 17, wherein the scarf nozzle includes a nozzle throat defining a generally slanted plane.

19. An aircraft, comprising:
   a wing-mounted jet engine;
   a nacelle for housing the jet engine, the nacelle being used to house the jet engine and including a fore end and an aft end; and
   a scarf nozzle at the aft end of the nacelle, the scarf nozzle including a first trailing edge portion and a second trailing edge portion disposed aft of the first trailing edge portion, the scarf nozzle being configured to at least mitigate an adverse wing pressure gradient increase between the nacelle and a wing surface of the aircraft and between the wing surface and an exhaust plume exiting the aft end of the nacelle to enable the nacelle to be positioned closer to the wing surface.

20. The aircraft of claim 19, wherein the scarf nozzle is configured to allow at least a portion of an exhaust plume exiting the aft end of the nacelle to interact more favorably with a fluid flow along one or more surfaces adjacent the scarf nozzle.

21. The aircraft of claim 19, wherein:
   the first trailing edge portion comprises an upper portion of the scarf nozzle; and
   the second trailing edge portion comprises a lower portion of the scarf nozzle.

22. The aircraft of claim 19, wherein the scarf nozzle comprises a plurality of chevrons configured to allow substantial mixing of at least a portion of an exhaust gas exiting the aft end of the nacelle with ambient air adjacent the scarf nozzle.

23. The aircraft of claim 19, further comprising a noise attenuating material lining at least a portion of an inner surface of the scarf nozzle.

24. The aircraft of claim 19, wherein a rear-most edge of the scarf nozzle is disposed at a bottommost trailing edge position of the scarf nozzle.

25. The aircraft of claim 19, wherein the scarf nozzle is configured to at least delay formation of shock waves between the nacelle and a wing surface adjacent the nacelle.

26. The aircraft of claim 19, wherein the scarf nozzle is configured to at least delay a formation of a shock wave between a wing surface adjacent the nacelle and an exhaust plume exiting the aft end of the nacelle.

27. The aircraft of claim 19, wherein the scarf nozzle is configured to at least mitigate an increase in an adverse pressure gradient caused by the nacelle and an exhaust plume exiting the aft end of the nacelle.

28. The aircraft of claim 19, wherein the scarf nozzle is configured to at least partially shield engine noise from being transmitted downward.

29. The aircraft of claim 19, wherein the scarf nozzle is controllably rotatable relative to the nacelle to a plurality of angular positions during different phases of operation of the aircraft.

30. The aircraft of claim 29, wherein the scarf nozzle is rotatable to dispose a rear-most edge of the scarf nozzle at at least one of:
   a topmost position of the scarf nozzle;
   a bottommost position of the scarf nozzle;
   an outboard position of the scarf nozzle; and a
   an inboard position of the scarf nozzle.

31. The aircraft of claim 29, wherein the scarf nozzle is rotatable to at least one of:
   a configuration in which the scarf nozzle imparts a downward vector to the exhaust plume;
   a configuration in which the scarf nozzle imparts an upward vector to the exhaust plume;
   a configuration in which the scarf nozzle imparts an outboard vector to the exhaust plume; and
   a configuration in which the scarf nozzle imparts an inboard vector to the exhaust plume.

32. The aircraft of claim 19, wherein an interior of the scarf nozzle is configured such that a velocity vector of the exhaust plume exiting the aft end of the nacelle is generally straight aft.

33. The aircraft of claim 19, wherein an interior of the scarf nozzle is configured to direct the exhaust plume to at least mitigate the exhaust plume from exiting the scarf nozzle adjacent the first trailing edge portion prior to reaching the second trailing edge portion.

34. The aircraft of claim 33, wherein the scarf nozzle includes a nozzle throat defining a generally slanted plane.

* * * * *